United States Patent [19]

Hashimoto

[11] Patent Number: 4,461,928
[45] Date of Patent: Jul. 24, 1984

[54] TELEPHONE CHARGE SYSTEM FOR DISPLAYING ALLOTMENT OF CHARGES BETWEEN A CALLING PARTY AND A CALLED PARTY

[75] Inventor: Kazuo Hashimoto, Tokyo, Japan

[73] Assignee: Hashimoto Corporation, Tokyo, Japan

[21] Appl. No.: 379,832

[22] Filed: May 19, 1982

[30] Foreign Application Priority Data

May 22, 1981 [JP] Japan ................................. 56-77478

[51] Int. Cl.$^3$ .......................................... H04M 15/18
[52] U.S. Cl. .................................................. 179/7 R
[58] Field of Search .............. 179/7 R, 7.1 R, 7.1 TP, 179/5.5, 2 TC

[56] References Cited

U.S. PATENT DOCUMENTS 4,079,201  3/1978  Scott et al. ........................ 179/7.1 R
4,224,472  9/1980  Zarount ............................ 179/7.1 R Primary Examiner—Stafford D. Schreyer
Attorney, Agent, or Firm—Lowe, King, Price & Becker

[57] ABSTRACT

A telephone charge displaying system has counters and first and second oscillation circuits which oscillate in response to an originating or terminating call. The first and second oscillation circuits are selectively operated in accordance with the originating or terminating call. The outputs from the counters are visually displayed as an integrated value of the telephone charge and as a telephone charge of each call.

5 Claims, 1 Drawing Figure

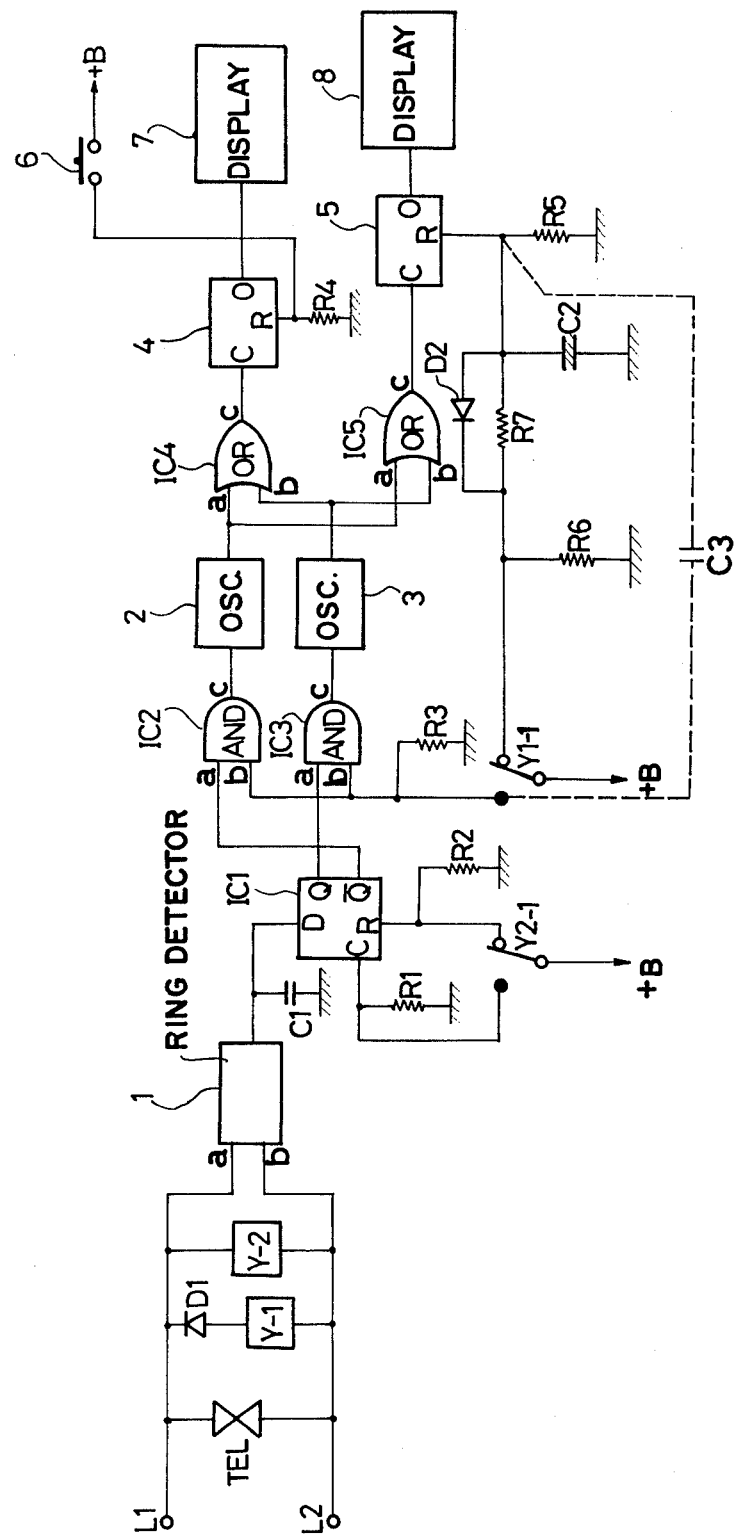

TELEPHONE CHARGE SYSTEM FOR DISPLAYING ALLOTMENT OF CHARGES BETWEEN A CALLING PARTY AND A CALLED PARTY

BACKGROUND OF THE INVENTION

The present invention relates to a telephone charge displaying system.

With the current telephone charge system, only the calling party pays for a telephone call. However, there are actually cases wherein a called party can obtain important information from a call and is in a position to pay for the charge. Such important information may be more readily provided if a called party is also to pay for the charge. With recent rapid advances in the communication technology, the current telephone charge system wherein the telephone charge is charged only to the calling party may prove to be inappropriate.

Meanwhile, there is another problem of mischievous calls or random calls made by a salesman. If a new telephone charge system wherein the called party also pays for the charge at least partially, the problem of mischievous calls or random calls made by a salesman may be moderated. Moreover, the called party may not unconditionally receive all the calls and may select only desired calls. Such a new telephone charge system is described in Japanese Laid-Open Patent Application No. 124,302/76 of the present applicant. According to this invention, the telephone number of a calling party is displayed on a telephone set of the called party. With this system, the called party can make a free selection, so that the problem of interference of the privacy of individuals or the problem of mischievous calls are eliminated. The present invention has been made to provide an improvement over this invention.

SUMMARY OF THE INVENTION

It is the first object of the present invention to provide a telephone charge system in which the telephone charge is charged to both the calling and called parties in a predetermined ratio when the calling party makes a phone call.

It is the second object of the present invention to provide a telephone charge displaying system which is mounted to each telephone set or an MDF terminal of each telephone line for displaying the telephone charge.

It is the third object of the present invention to provide a telephone charge displaying system which uses a low-power consumption-type element so that a power source which may be charged under the floating condition from the telephone line may be used.

BRIEF DESCRIPTION OF THE DRAWINGS

The single drawing is a block diagram of a telephone charge displaying system according to an embodiment of the present invention.

DETAILED DESCRIPTION OF THE PREFERRED EMBODIMENT

The configuration and mode of operation of the telephone charge displaying system according to the embodiment of the present invention will now be described with reference to the accompanying block diagram.

Referring to the drawing, reference symbols $L_1$ and $L_2$ denote telephone lines; TEL, a telephone set; $D_1$, a diode; Y-1, a relay; and y1-1, a contact. The diode $D_1$ and the relay Y-1 serve to detect the polarity inversion of the lines when a call is made. A relay Y-2 of high impedance is ON when the telephone set TEL hooked on and is OFF when the telephone set TEL is hooked off. A ringing amplifier 1 detects a ringing. An output terminal c of the ringing amplifier 1 is kept at high level "H" (hereinafter referred to as "H" for brevity hereinafter) while the ringing is received. The polarities of output terminals Q and $\overline{Q}$ of a D flip-flop $IC_1$ are inverted when the telephone set TEL is hooked off. The polarities of the output terminals Q and $\overline{Q}$ are not inverted by a signal at a terminal D in the case of an originating call from the telephone set TEL. AND gates $IC_2$ and $IC_3$ are respectively connected to the input ends of first and second multivibrators 2 and 3. In the case of an originating call, the first multivibrator 2 generates signals of a first frequency f1 for a telephone charge meter to be described later. The second multivibrator 3 generates signals of a second frequency f2 as a reference of the telephone charge to be payed in the case of a terminating call. OR gates $IC_4$ and $IC_5$ are respectively connected to the input ends of first and second counters 4 and 5. The first counter 4 counts the signals of the first and second frequencies f1 and f2 from the first and second multivibrators 2 and 3 and integrate the count values or the telephone charge. The second counter 5 similarly counts the signals of the first and second frequencies f1 and f2. However, unlike the first counter 4, the second counter 5 only counts the signals for each call. A manual reset button 6 is used to clear the count value of the first counter 4 when the system is used for the first time. The second counter is kept uncleared by a time constant circuit consisting of a resistor $R_7$ and a capacitor $C_2$ at least for a predetermined period of time from the on-hook signal on a close of the call, and is automatically cleared after that. However, it is possible to omit a circuit connecting the contact indicated by a hollow circle of the contact y1-1 between a resistor $R_5$ and a reset terminal R in the second counter, and to insert a capacitor $C_3$ in a circuit indicated by a broken line. Because a display may be kept practically at least till an off-hook signal on opening of a next call. In this case, the second counter 5 is not cleared by a pulse occured by the capacitor $C_2$, but is cleared by a pulse occured by the capacitor $C_3$ which is acted by the which is made by the off-hook signal on opening of the next call. A first display unit 7 displays the count value of the first counter 4 or the integrated value of the telephone charge. A second display unit 8 displays the count value of the second counter 5 or the charge of each telephone call.

The system of the present invention comprises the parts as described above and operates in the manner to be described below. A case of an originating call will now be described. When the calling party picks up the handset of the telephone TEL, the voltages at the telephone lines $L_1$ and $L_2$ fall from about 40 volts to several volts. Then, the relay Y-2 is turned off, and the armature of a contact y2-1 is switched from the contact indicated by a hollow circle to the contact indicated by a solid circle. The reset status of the D flip-flop $IC_1$ is released, and a clock signal is supplied to the clock input terminal C through the contact y2-1. Since a ringing is not received in this case, the input terminal D of the D flip-flop $IC_1$ is at low level "L" (to be referred to as "L" for brevity hereinafter). The outputs from the Q and $\overline{Q}$ output terminals thus remain non-inverted; the output terminal Q is at "L" and the output terminal $\overline{Q}$ is at "H". Thus, only one input terminal a of each of the AND gates $IC_2$ and $IC_3$ is at "H". When the called party hears the ringing and picks up the handset, the polarities of the telephone lines $L_1$ and $L_2$ are inverted and the relay Y-1 is turned on. The contact y1-1 of the relay Y-1 is switched from the contact indicated by a hollow circle to a contact indicated by a solid circle. Then, a reset signal +B which has been supplied to the second counter 5 through the resistor $R_7$ is now supplied to the input terminals b of the AND gates $IC_2$ and $IC_3$ so that these input terminals b rise to "H". As may be seen from the above description, the output terminal c of the AND gate $IC_2$ goes to "H" to drive the multivibrator 2. The signals of the first frequency f1 generated by the first multivibrator 2 are supplied to the first counter 4 to drive it through one input terminal a and the output terminal c of the OR gate $IC_4$ as well as to the second counter 5 to drive it through one input terminal a and the output terminal c of the OR gate $IC_5$. Counter outputs 0 from the respective counters 4 and 5 are supplied to the first and second display units 7 and 8 for display of telephone charges proportional to time with light-emitting diodes or liquid crystal display elements. When the call is terminated, the armature of the contact y1-1 returns to the position shown in the drawing. Then, the input terminal b and the output terminal c of the AND gate $IC_2$ go to "L". Then, the multivibrator 2 which has been driven by the output signal from the AND gate $IC_2$ stops oscillating. The first and second counters 4 and 5 thus stop their counting operations. The first counter 4 is not cleared and the count value is held until a next call is received. The count value (telephone charge) is visually displayed at the first display unit 7. On the other hand, as has been described, the second counter 5 is cleared after certain time, for example, 5 seconds from the termination of the call. This time period is determined by the time contact circuit consisting of the resistor $R_7$ and the capacitor $C_2$. Thus, the count value of the preceding call displayed at the second display unit 8 is cleared. This time period is provided so as to allow confirmation of the charge of a call.

A case of a terminating call will now be described. In this case, the ringing is detected by the ringing amplifier 1 and the output terminal c thereof goes to "H" to charge a capacitor $C_1$. The charge is stored in the capacitor $C_1$ even if the ringing is of short period, for example, 2 seconds. Thus, once the ringing is detected, the input terminal D of the D flip-flop $IC_1$ goes to "H". When the telephone set TEL is hooked off in this state, the relay Y-2 is turned off, and the armature of the contact y2-1 is switched from the contact indicated by a hollow circle to the contact indicated by a solid circuit. Thus, a clock is supplied to the D flip-flop $IC_1$ to invert its outputs; the output terminal Q goes to "H" and the output terminal $\overline{Q}$ goes to "L". The output terminal c of the AND gate $IC_3$ goes to level "H". When the called party picks up the handset, the relay Y-1 is turned on. The armature of the contact y1-1 is switched from the contact indicated by a hollow circle to the contact indicated by a solid circle. The reset signal +B is then supplied to the input terminal b of the AND gate $IC_3$. As may be apparent from the above description, the output terminal c of the AND gate $IC_3$ goes to "H" to drive the second multivibrator 3. The second multivibrator 3 generates the signals of the second frequency f2 from its output terminal. These signals are supplied to the first counter 4 to drive it through input terminal b and the output terminal c of the OR gate $IC_4$, as well as to the second counter 5 through the input terminal b and the output terminal c of the OR gate $IC_5$. If the second frequency f2 is set to be ⅓ the first frequency f1, the telephone charge of the case of a call from a third party is displayed at the second display unit 8, which is ⅓ that of the case made to a third party from the system. The first display unit 7 displays the sum of the integrated telephone charge up to the immediately preceding call and the current telephone charge. Although the charging ratio may be changed by freely setting the frequencies f1 and f2, the charging ratio between the calling party and the called party is generally set to be n:1 (where n is a real number satisfying a relation $n \geq 1$).

In relation to the power source for the system of the present invention, the ICs and the display units of the system comprise low-power consumption-type C-MOSs and liquid crystal display elements, and the operating current is 100 μA or less. Accordingly, a battery may be charged in the floating state from the telephone powered by this battery. Further, a solar battery may be used as the power source which is placed outside.

In summary, the problems of the conventional telephone charge system wherein only the calling party pays the charge are eliminated by making the called party pay at least partially for the call. The advantages of the system of the present invention are tremendous.

Since the system of the present invention can be arranged in the vicinity of each telephone set or an MDF termnal, the subscriber may be able to make a call while monitoring the telephone charge.

Although the present invention has been described with its particular embodiment, the present invention is not limited to this. The present invention is thus limited only by the scope of the appended claims which allow various modifications.

What is claimed is:

1. A telephone charge displaying system comprising:
   means for detecting and identifying one of an originating and a terminating call;
   a first oscillation circuit in said detecting means which oscillates at a first frequency when a handset is placed off hook;
   a second oscillation circuit in said detecting means which oscillates at a second frequency having a predetermined ratio to the first frequency in accordance with a charging ratio between a calling party and a called party after an off-hook signal is detected when a handset is hooked off in response to a ringing;
   a first counter which counts, in units of at least seconds, signals of the first or second frequency in response to an originating or terminating call and which keep counting the signals to integrate a count value until the count value is cleared after being set once;
   a second counter which counts the signals of the first and second frequencies for each call until the end of the call;
   a first display unit for displaying the integrated count value of said first counter; and
   a second display unit for displaying a count value of said second counter at least until an origination of a next call.

2. A system according to claim 1, wherein the charging ratio is n:1 (where n is a real number satisfying a relation $n \geq 1$).

3. A system according to claim 1, wherein said first and second display units are incorporated in the vicinity of a telephone set or an MDF terminal.

4. A system according to any one of claims 1 to 3, wherein said system has a power source which can be charged in a floating state from a telephone line.

5. A system according to any one of claims 1 to 3, wherein said system has a power source which can be charged from a solar battery.

* * * * *